(12) United States Patent
Tinker

(10) Patent No.: US 6,301,009 B1
(45) Date of Patent: *Oct. 9, 2001

(54) IN-SITU METROLOGY SYSTEM AND METHOD

(75) Inventor: Flemming Tinker, Cheshire, CT (US)

(73) Assignee: Zygo Corporation, Middlefield, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/982,236

(22) Filed: Dec. 1, 1997

(51) Int. Cl.⁷ ....................................................... G01B 9/02
(52) U.S. Cl. ........................................... 356/511; 356/519
(58) Field of Search ................................... 356/359, 360, 356/345, 357, 358, 355, 450, 503, 511, 498, 519

(56) References Cited

U.S. PATENT DOCUMENTS

| | | | |
|---|---|---|---|
| 4,417,816 | * 11/1983 | Kindl | 356/357 |
| 4,594,003 | 6/1986 | Sommargren | 356/349 |
| 5,488,477 | * 1/1996 | De Groot | 356/359 |
| 5,633,711 | 5/1997 | Nelson et al. | 356/318 |
| 5,649,849 | * 7/1997 | Pileri et al. | 451/1 |

OTHER PUBLICATIONS

"Annular Lapping of Precision Optical Flatware," Frank Cooke, Norman Brown, Eberhard Prochnow, Optical Engineering, Sep. –Oct. 1976, vol. 15, No. 5.*

"Annular Lapping of Precision Optical Flatware", Frank Cooke, Norman Brown, Eberhard Prochnow Optical Engineering, Sep.–Oct. 1976, vol. 15, No. 5.

"Interferogram Interpretation and Evaluation Handbook", Zygo Corporation, Apr. 1993.

"Extending the Accuracy and Precision of In–situ Ultrasonic Thickness Measurements", D.E. Dunn, J.R. Cerino, Hughes Danbury Optical Systems, American Society for Precision Engineering 1995 Proceedings vol. 12.

Phase Shifting Interferometry. J. E. Greivenkamp et al. Optical Shop Testing, Second Edition, pp. 501–513, 1992.*

* cited by examiner

*Primary Examiner*—Frank G. Font
*Assistant Examiner*—Andrew H. Lee
(74) *Attorney, Agent, or Firm*—Francis J. Caufield

(57) ABSTRACT

At least one dimensional characteristic of a workpiece is measured, in situ, while at least one surface of the workpiece is subjected to a finishing operation. The measurements are obtained using an interferometer that generates interfering wavefronts reflected from the front and rear surfaces of the workpiece. Variations in the optical thickness of the workpiece can be determined from the resulting interferogram. The resulting optical thickness data can be used directly and/or combined with other pre-acquired data about the workpiece to obtain information concerning a desired dimensional characteristic of the workpiece. This dimensional characteristic may be transmitted wavefront error, work surface smoothness, and/or work surface profile. These measurements then can be used to terminate the finishing process at an optimal time and/or to control the operation of the surface-finishing machine. The difference in temperature between a workpiece's work surface and the surface opposed to it can also be extracted from the metrology results when measured in conjunction with a witness sample or monitor plug which demonstrates a differing thermal deformation characteristic due to a different thickness or having a differing coefficient of thermal expansion. Preferably, the witness sample or monitor plug should be made from a material that is relatively insensitive to temperature changes with respect to the workpiece. This temperature differential then can be used to control the temperature of a finishing process parameter such as slurry temperature. A finishing process that incorporates in situ metrology can dramatically reduce the surface finishing process time as compared to conventional finishing processes.

30 Claims, 6 Drawing Sheets

IN-SITU METROLOGY SYSTEM AND METHOD

BACKGROUND OF THE INVENTION

1. Field of the Invention

The invention relates to surface finishing machines and, more particularly, relates to a method and apparatus for measuring a dimensional characteristic of a workpiece, in-situ, while it is positioned on a surface finishing machine and even while it is being polished or otherwise finished by the surface finishing machine. In a particularly preferred embodiment, variations in the optical thickness of the workpiece are measured by an interferometer, and these measurements are used to control the finishing process to obtain a desired workpiece dimensional characteristic.

2. Discussion of the Related Art

Surface finishing machines are used in numerous applications for polishing, grinding, or otherwise machining one or more surfaces of workpieces made from glass, silicon, metals, ceramics, etc. A surface finishing machine may be adapted to finish a workpiece to a desired thickness, a desired transmitted wavefront quality, a desired smoothness, and/or a desired profile.

One type of surface finishing machine to which the invention is particularly (but not exclusively) applicable is a ring polisher. A ring polisher, sometimes known as a Crane polisher, a lapping machine, a planetary polishing machine, or a continuous polishing machine, is characterized by a large rotating turntable presenting an upper work surface or lap formed by a pitch annulus. Disposed either directly on top of the lap or slightly above the lap are a plurality of work rings which are driven to rotate by rollers. At least one workstation is located in the interior of each work ring for receiving a workpiece. A large, flat conditioning tool is disposed on the surface of the lap and can be rotated and translated radially to adjust the flatness of the lap.

In use, a workpiece is deposited in a corresponding workstation (i.e., within a corresponding work ring), the lap is flooded with a slurry that contains a polishing grit or finishing grit, and the turntable is driven to rotate, thereby causing the work rings to rotate. The workpiece moves with the work ring over the lap at an angular velocity which is synchronous with the velocity of the lap so that the time averaged relative velocity between the lap and every location on the work surface of the workpiece remains constant. The relative movement between the workpiece and the lap polishes the front surfaces of the workpiece via chemo-mechanical abrasion by the grit in the slurry.

The polishing process must be carefully monitored and controlled to achieve the desired results. For instance, if the workpiece is a glass element designed for use as an optical quality element, the topography of the front or work surface must be held to a designated smoothness and profile within sub-micron tolerances. In order to achieve this degree of polishing precision, the effects of the polishing operation on the work surface must be carefully monitored, and the operation of the ring polisher or other surface finishing machine must be adjusted if the profile of the work surface deviates from the desired profile.

The monitoring and adjustment operations are laborious, iterative, and time consuming. First, at least one workpiece (hereinafter a "sample workpiece) must be removed from the ring polisher for testing. Then, in order to obtain an accurate measurement of the steady-state profile of the sample workpiece, the machine operator must wait a period of time after removing the sample workpiece from the ring polisher to allow the workpiece to reach dimensional equilibrium. This equilibration period depends on the material and dimensions of the element but may typically vary from 5 minutes to an hour or more. This delay results from the fact that a sample workpiece is initially distorted with respect to its isothermal shape when it is removed from the ring polisher because of 1) thermal expansion from heat generated by friction during the polishing process and 2) thermal distortion due to liquid evaporation from the sample workpiece. Then, if the workpiece's work surface is more concave or convex than desired (hence indicating that the lap is more convex or concave than desired), the operator must adjust the radial position of the conditioning tool relative to the lap by an amount estimated to compensate for this defect, place the sample workpiece back into its workstation, and wait for the workpiece to be polished for a period of time which is sufficient to permit the effects of the finishing process adjustment to be reflected on the work surface of the workpiece. This period again varies, but may typically be as long as two hours. The sample workpiece then must be removed from the ring polisher once again, allowed to reach dimensional equilibrium, and measured to ascertain the effects of the previous adjustment on the finishing process. The period between the time that a workpiece is initially removed from the ring polisher for topographical measurement to the time that an operator is apprised of the effects of adjustments resulting from that measurement on the polishing operation may be three hours or more.

Even the most skilled operator cannot predict with certainty the effects of many typical adjustments to finishing machine operation. Adjustments typically undershoot or overshoot the desired effect so that, for instance, a workpiece that was initially too convex upon initial testing may be too concave after the adjustment and subsequent testing. As a result, measurement and adjustment must be performed iteratively. Ten to twenty iterations may typically be required for the polishing of a precision polished glass workpiece designed for use as an optical quality element. Since each iteration may take three hours or more, the aggregate period for the polishing process may be thirty to sixty hours or even longer. As most pre-finishing operations such as grinding are capable of producing surface flatness errors on the order of a few microns, and finishing removal rates are on the order of 1 micron per hour, only a small percentage of the finishing period—typically about two to three hours—is required to obtain the desired smoothness. Hence, a polishing process could take as little as two to three hours if it never required adjustment or if adjustment feedback could be obtained instantaneously instead of taking ten to twenty multiples of that time or more.

The above-described iterative polishing process may in some instances be accelerated by using a so-called "monitor plug" or "witness sample" for testing purposes. A monitor plug typically is a workpiece that is very stable and that is not as sensitive to temperature changes as the other, "true" workpieces being simultaneously polished in other workstations. If the monitor plug is held to the desired profile with some specifications, the operator can obtain some assurance that the "true" workpieces in the other workstations have essentially the same profile by periodically measuring the profile of the monitor plug. As a result, there is no need to measure every workpiece every time. However, an iterative measurement and adjustment process still is required, and even the monitor plug must be allowed to reach dimensional equilibrium during each measurement cycle before its profile can be measured.

The above-described iterative polishing process could be accelerated dramatically if profile measurements could be obtained in-situ (i.e., as a workpiece is being worked on a ring polisher or other surface finishing machine) because there would be no need to remove the workpiece from the surface finishing machine and allow it to reach dimensional equilibrium before measurement.

One technique for in-situ metrology is disclosed in "Extending the Accuracy and Precision of In-Situ Ultrasonic Thickness Measurements", Dunn and Cerino, American Society for Precision Engineering, 1995 Proceedings, Volume 12 (the Dunn and Cerino paper). The Dunn and Cerino paper proposes ultrasonic thickness gauging to achieve precision management of material removal. A plurality of ultrasonic probes are mounted on the back surface or unfinished surface of a workpiece being polished. These probes each emit a sound pulse that travels through the thickness of the workpiece and back to the probe. Time of flight measurements then are used to gauge the thickness of the workpiece at the locations of the probes.

The ultrasonic thickness gauges disclosed in the Dunn and Cerino paper have drawbacks that limit their resolution and render them impractical for optical lens applications and many other applications in which extremely high precision surface finishing is required. For instance, thickness measurements can be obtained only at the locations of the probes, and it is impractical or even impossible to cover the entire surface of a workpiece with probes. Hence, the optical thickness can be measured only at the locations of the probes and must be estimated elsewhere. In addition, speed of sound is highly dependent upon the properties of the material through which the sound is traveling. Impurities, voids, etc., may be present in workpieces that render them non-homogeneous. These inhomogeneities adversely affect depth measurements obtained from time of flight measurements. These and other drawbacks of the ultrasonic thickness measurements disclosed in the Dunn and Cerino paper limit the resolution of that technique to about one to two microns. This resolution is much too low for many applications.

Another inadequacy of conventional ring polishers and other surface finishing machines is their inability to prevent thermal deformation of a workpiece. As discussed above, the workpiece may undergo thermal expansion during finishing due to friction with the abrasive grit or other machining element or media. Excessive thermal expansion is undesirable because, as the front surface of the workpiece distorts due to thermal expansion, the workpiece's weight will not be distributed evenly over the front surface. This uneven weight distribution leads to uneven wear during the finishing operation.

In order to limit the detrimental effects of thermal expansion on a polishing or other finishing process, it would be desirable to incorporate measures to maintain temperature differentials across a workpiece at acceptable levels. For instance, a ring polisher could incorporate a temperature controller in its slurry supply system that is capable of adjusting the temperature of the slurry flowing over the lap in response to signals from thermal sensors disposed on the lap. However, currently available thermal sensors are incapable of providing a sufficiently accurate indication of the temperature differential across the workpiece to permit precise control of slurry temperature.

OBJECTS AND SUMMARY OF THE INVENTION

It is therefore a principal object of the invention to perform in-situ metrology on a workpiece being finished on a surface-finishing machine.

Another object of the invention is to provide a process that meets the first principal object, that detects variations in the optical thickness of a workpiece, and that uses these detected changes to determine the topography of the work surface of the workpiece.

In accordance with a first aspect of the invention, these objects are achieved by providing a method of finishing a workpiece that includes 1) subjecting at least one surface of the workpiece to a finishing process in a finishing machine and 2) measuring a dimensional characteristic of the workpiece during the finishing process. The measuring step uses an interferometer and is performed while the workpiece is in the finishing machine and preferably (but not necessarily) while the workpiece is being worked.

Another object of the invention is to provide a process that meets at least the first principal object of the invention and that uses metrology results as inputs to a control system which automatically adjusts or maintains the operational parameters of the surface finishing machine so as to obtain a desired surface workpiece dimensional characteristic. This adjustment could comprise terminating the finishing operation upon determining that the workpiece exhibits the desired dimensional characteristic.

If, for instance, the finishing machine is a ring polisher including a rotating table, a lap which is disposed on the table, and a rotating conditioning tool which is supported on the lap and which is movable radially with respect to the table to alter a profile of the lap, the adjusting step may comprise altering the position of the conditioning tool radially relative to the table to alter the profile of the lap.

Still another object of the invention is to provide a process that meets at least the first principal object and that uses the metrology results to calculate a temperature difference across the workpiece.

In accordance with another aspect of the invention, this object is achieved by 1) measuring thermal distortion of the workpiece using the results of the measuring step and 2) determining a temperature difference across the workpiece from the measured thermal distortion. The temperature differential can then be reduced or eliminated, e.g., by altering the temperature of a slurry circulating through the finishing machine.

A second principal object of the invention is to provide a system that includes a surface finishing machine and a dedicated interferometer capable of performing in-situ metrology on workpieces being worked by the surface-finishing machine.

In accordance with still another aspect of the invention, this object is achieved by providing a system comprising 1) a finishing machine including a workstation for receiving a workpiece to be subjected to a finishing operation and 2) an interferometer which is positioned with respect to the workstation so as to perform in-situ metrology on the workpiece located in the workstation.

A controller preferably is provided which is coupled to the interferometer and which generates an output signal in response to operation of the interferometer. The output signal may be a humanly-discernible signal indicative of a dimensional characteristic such as the profile of the workpiece's work surface. Alternatively, the output signal could be a control signal which controls at least one operational parameter of the finishing machine. If the finishing machine is a ring polisher, the controller may be electronically coupled to the conditioning tool of the ring polisher and be operable to automatically alter the radial position of the conditioning tool relative to the table based upon signals received from the interferometer.

The controller may also be operable, using signals from the interferometer, to determine a temperature difference across the workpiece, and to automatically cause the slurry supply system of the ring polisher to alter the temperature of slurry circulated by the supply system to reduce or eliminate a temperature difference across the workpiece.

These and other objects, features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

1. Resume

Figure 1:
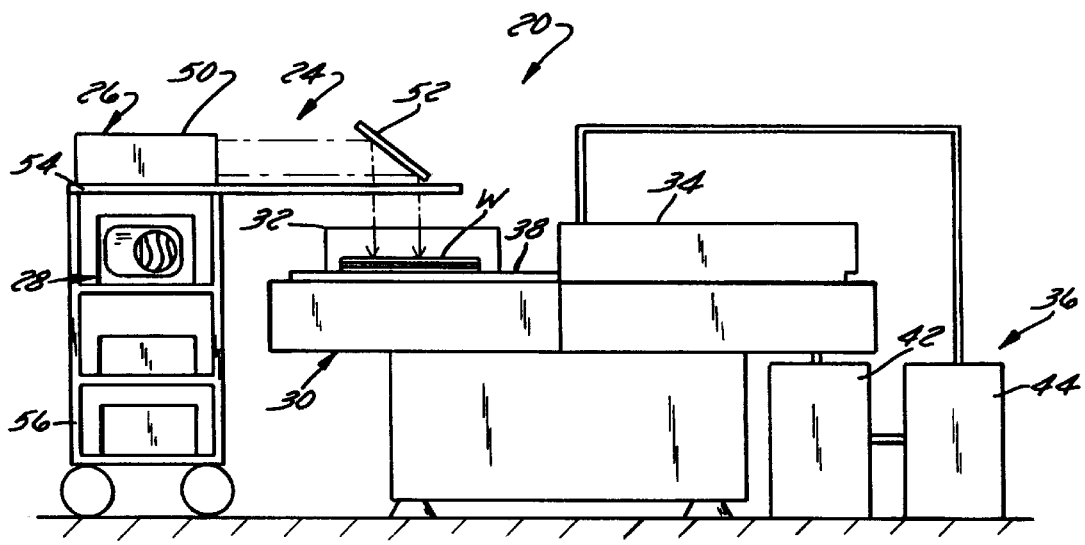
FIG. 1 is a schematic side elevation view of a surface finishing machine and an associated in-situ metrology system constructed in accordance with a preferred embodiment of the invention.

Pursuant to the invention, at least one dimensional characteristic of a workpiece is measured, in-situ, while at least one surface of the workpiece is subjected to a finishing operation. The measurements are obtained using an interferometer that generates interfering wavefronts reflected from the front and rear surfaces of the workpiece. Variations in the optical thickness of the workpiece can be determined from the resulting interferogram. The resulting optical thickness data can be used directly and/or combined with other pre-acquired data about the workpiece to obtain information concerning a desired dimensional characteristic of the workpiece. This dimensional characteristic may be optical thickness uniformity, work surface smoothness, and/or work surface profile. These measurements then can be used to terminate the finishing process at an optimal time and/or to control the operation of the surface-finishing machine. The difference in temperature between a workpiece's work surface and the surface opposed to it can also be extracted from the metrology results when measured in conjunction with a witness sample or monitor plug which demonstrates a differing thermal deformation characteristic due to a different thickness or having a different coefficient of thermal expansion. Preferably, the witness sample or monitor plug should be made from a material that is relatively insensitive to temperature changes when compared to the workpiece. This temperature differential then can be used to control the temperature of a finishing process parameter such as slurry temperature.

2. System Overview in Construction and Operation of System Component

At the core of the invention is the incorporation of an interferometer into a surface finishing system so that the interferometer can obtain measurements of one or more dimensional characteristics of a workpiece in-situ, i.e., as at least one surface of the workpiece is being polished or otherwise worked by the surface finishing machine. The invention is applicable to any surface finishing machine which has a workstation in which at least one surface of a workpiece is ground, milled, polished, or otherwise worked and which is capable of being at least periodically incident with a beam of coherent light from a light source of the interferometer. Surface finishing machines with which the invention is applicable include, for example, ring polishing machines, ion polishing machines, ion milling machines, Chemo-Mechanical Polishing (CMP) Machines, CNC polishing machines having polishing tools on a computer driven spindle, single point diamond turning machines, and single spindle polishing machines. The position of a workpiece with respect to the operative component(s) of an associated finishing machine varies significantly from application to application. In some applications, the workpiece is supported on a lap or a similar structure. In other applications, the workpiece is held by a spindle or an arm, For the sake of convenience, workpieces will be discussed as being "on" the finishing machine, it being understood that "on" is intended to encompass any positional relationship between a workpiece and an operative component of a finishing machine in which the operative component is capable of performing a finishing operation on the workpiece.

Workpieces finished by finishing machines include, for example, silicon wafers, metal optical elements, and ceramic or glass workpieces such as optical mirrors, flats, prisms, or windows. These types of workpieces may be considered "true" workpieces. A workpiece also could comprise a so-called "monitor plug" or "witness plug" that is worked along with the true workpiece(s) and that is monitored to gauge corresponding changes in the true workpiece(s). In-situ metrology of monitor plugs rather than or in addition to the "true" workpieces may be preferred in some instances. For instance, if precise knowledge of the measured characteristic of each "true" workpiece is not essential, monitoring can be simplified by monitoring only a single monitor plug as opposed to monitoring multiple workpieces. Moreover, when monitoring thermal distortion due to a temperature differential across the workpiece, it is preferred that a monitor plug be evaluated that is relatively thermally insensitive when compared to the "true" workpieces so that deformations due to temperature differentials can be distinguished from deformations due to lap out-of-flatness as discussed in detail in Section 4. Below. A monitor plug can also be used for in-situ metrology in applications in which the "true" workpieces are opaque to radiation. Hence the term "workpiece" as used herein should be construed broadly to include "true" workpieces, a selected one of several workpieces, and/or a monitor plug or witness plug. By way of practical example, the invention will be described primarily in conjunction with a polishing system 20 illustrated schematically in FIGS. 1 through 4. This polishing system includes 1) a ring polisher 22 and 2) an in-situ metrology system 24. The in-situ metrology system 24 includes an interferometer 26 and a monitoring/control system 28. Each of these components now will be described in detail.

The ring polisher 22 (sometimes called a ring polishing machine, a Crane polisher, a lapping machine, a planetary polishing machine, or a continuous polishing machine) is conventional and is well known to those skilled in the art. It includes as its principal components a turntable 30, a ring assembly 32, a conditioning tool 34, and a slurry supply system 36. The turntable 30 is a circular structure that is quite large—typically having a diameter of typically one to several feet. The turntable 30 is formed from an extremely rigid material such as a single slab of granite or metal plate. A lap 38 is disposed on the upper surface of the turntable 30 and serves as the finishing surface of the ring polisher 22. The lap 38 is formed from a layer of a Visco—elastic material deposited on top of the turntable slab. The typical lap material is sufficiently liquid to permit it to be worked into a desired shape but is sufficiently viscous to maintain this shape for substantial periods of time during the polishing operation. It is also sufficiently porous to permit grit from the slurry supplied by the slurry supply system 36 to become imbedded in its upper or polishing surface. Optical polishing pitch is often used as is also polyurethane foam.

Figure 2:
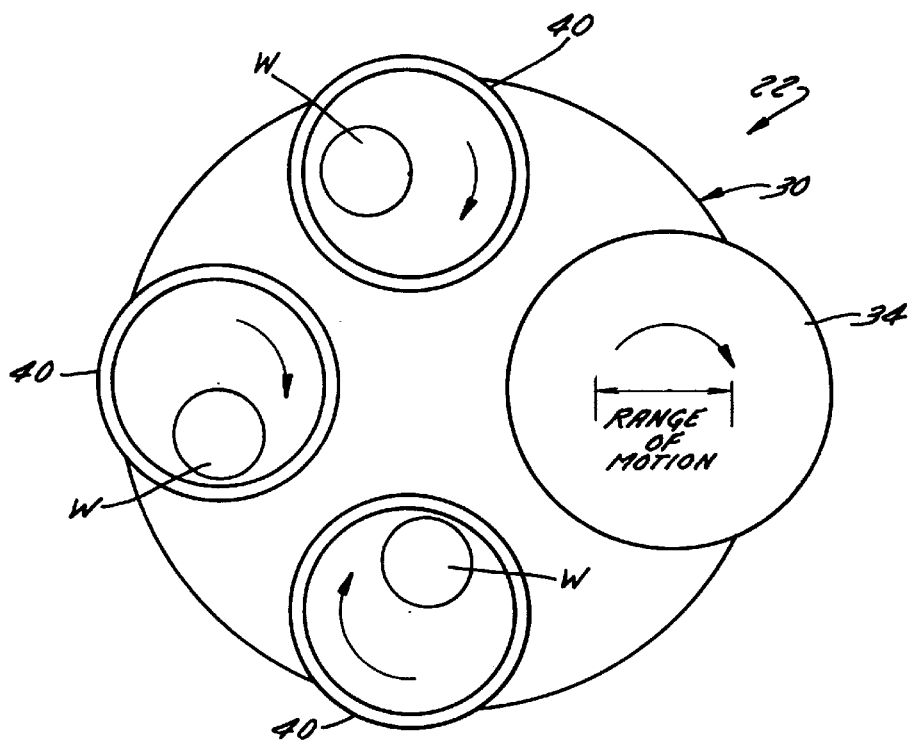
FIG. 2 is a schematic top plan view of the surface finishing machine and a portion of the in-situ metrology system of FIG. 1.

Referring to FIGS. 1 and 2, the ring assembly 32 is mounted on top of the turntable 30 and conveys workpieces W over the surface of the lap 38. The ring assembly 32 includes a plurality of work rings 40 which are mounted on the lap 38 and which are driven by rollers (not shown) to rotate with respect to the lap 38. A plurality (three in the illustrated embodiment) of these work rings 40 are spaced circumferentially around the lap 38 with a substantial circumferential space formed between two of the work rings for receiving the conditioning tool 34.

The interiors of the work rings 40 define workstations for receiving the workpieces W. Each workstation may comprise an open interior of a corresponding work ring 40 as illustrated or, alternatively, may comprise a metal, plastic or phenolic septum (not shown) that is disposed within the corresponding work ring 40 and that holds a corresponding workpiece. The drive rollers for the work rings 40 are controlled such that, as the turntable 30 rotates and the work rings 40 rotate on the lap 38, the workpieces W rotate at a synchronous angular velocity with respect to the lap 38. This synchronous rotation is important because, at synchronicity, it is possible to obtain equal wear across the entire work surface of each workpiece W whereas, with even a small difference in angular velocities, a radial wear gradient will exist across the work surface. Design considerations for obtaining synchronous rotation do not per se form part of the present invention. Those interested in obtaining synchronous rotation can refer, for example, to Annular Lapping of Precision Optical Flatware, Cooke et al., Optical Engineering, Volume 15, No. 5, September–October, 1976 (the Cooke et al. paper).

The purpose of the conditioning tool 34 (sometimes known in the art as a persuader, a bruiser, or a truing tool) is to control the flatness of the lap 38 so as to work the lap surface into a desired profile. This profile typically, but not necessarily, will be flat. The illustrated conditioning tool 34 is typical of those found in the art. It comprises a large, hard, dimensionally-stable circular element that rests on the lap 38. The conditioning tool 34 has 1) a diameter which is roughly equivalent to the radius of the turntable 30 and 2) is positioned eccentrically with respect to the turntable 30 so that it extends over the edge of the turntable 30 as seen in FIG. 2. The conditioning tool 34 is driven to rotate by a suitable drive mechanism (not shown) and also can be translated radially with respect to the turntable 30 in a known manner as illustrated by the arrows in FIG. 2. Radial movement of the conditioning tool 34 relative to the lap 38 alters the concavity or convexity of the lap surface. Lap surface concavity increases as the conditioning tool 34 moves radially inwardly and decreases as the conditioning tool 34 moves radially outwardly.

The slurry supply system 36 circulates a slurry over the lap 38 in a closed loop. The slurry comprises water or another suitable liquid which contains grit or another abrasive substance. Some of the grit is imbedded in the pores of the upper surface of the lap 38, while other grit rolls or moves between the upper surface of the lap 38 and the workpieces W so that the workpieces W are polished both by the chemical interaction of the fluid and/or abrasion with the rolling grit and by abrasion with the stationary grit. The slurry supply system 36 includes a slurry tank 42 and a slurry heater/chiller assembly 44. The slurry tank 42 has an inlet connected to the lap 38 and an outlet connected to the heater/chiller assembly 44. The heater/chiller assembly 44 has an inlet connected to the outlet of the slurry tank 42 and an outlet connected to the lap 38. Disposed between and/or within the slurry tank and heater/chiller assembly 44 are 1) a pump which circulates slurry through the slurry supply system 36, and 2) a slurry temperature controller that may comprise a separate heater and chiller or a single device capable of performing both functions.

The interferometer 26 may comprise any system capable of 1) projecting a collimated light beam onto a workstation (i.e., into the interior of a work ring 40), 2) recombining wavefronts coming from the workpiece W, and 3) analyzing the recombined light beam. The interferometer 26 of the illustrated embodiment includes as its main components a mainframe 50 and a fold mirror 52. However, as discussed below, the workpiece W could be considered to be part of the interferometer 26 because it produces interfering wavefronts. The mainframe 50 is mounted on a mainframe platform 54 that is positioned above the turntable 30 but that is spaced radially from it. The illustrated platform 54 is mounted on a mobile cart 56 that also houses the monitoring/control system 28.

The mainframe 50 could comprise any suitable commercially available interferometer such as a GPI interferometer manufactured and marketed by Zygo Corp. The typical such mainframe includes a light source such as a laser, a spatial filter-beam diverger which diverts the laser beam generated by the laser into a diverging spherical wavefront, a beamsplitter that diverts part of the diverging spherical wavefront from the filter beam, and a collimating lens that collimates the wavefront emerging from the diverger to produce a collimated wavefront of coherent light which is transmitted to the fold mirror 52. Also included in the mainframe 50 is an imaging device such as a solid state camera which receives wavefronts received from the workpiece W and reflected by the beamsplitter and which produces images of the resultant interference pattern. Operation of the imaging device and of the light source is controlled by an internal electronic processor that is electronically coupled to both the imaging device and to the light source. An interferometer having all of the above-described components of the mainframe 50 of this type is disclosed in U.S. Pat. No. 4,594,003 to Sommargren (the Sommargren patent), the relevant portions of which are hereby expressly incorporated by reference. It should be recognized, however, that the element described as a "Fizeau-type interferometer" and denoted by the reference numeral 25 in the Sommargren patent is replaced in the present invention by the workpiece W in that, like the Fizeau-type interferometer 25 disclosed in the Sommargren patent, the workpiece W defines an interference cavity so as to receive a plano wavefront and to reflect interfering wavefronts back to the collimating lens and then to the beamsplitter.

The fold mirror 52 is mounted on a suitable support over the turntable 30 and is positioned at an angle so that the collimated beam from the collimating lens is deflected at an angle of 90° and is directed downwardly as represented by the phantom lines in FIG. 1 and onto a portion of the lap 38 through which the workstations travel during operation of the ring polisher 22. The fold mirror 52 also receives the reflected beams or wavefronts from opposed front and rear surfaces S1 and S2 of the workpiece W and deflects these beams back to the GPI mainframe 50. The fold mirror 52 conceivably could be eliminated by positioning the GPI mainframe 50 directly over the turntable 30. The illustrated and described arrangement is preferred, however, because a fold mirror 52 can be mounted over the turntable 30 substantially more easily than a GPI mainframe can be mounted over a turntable.

Figure 3:
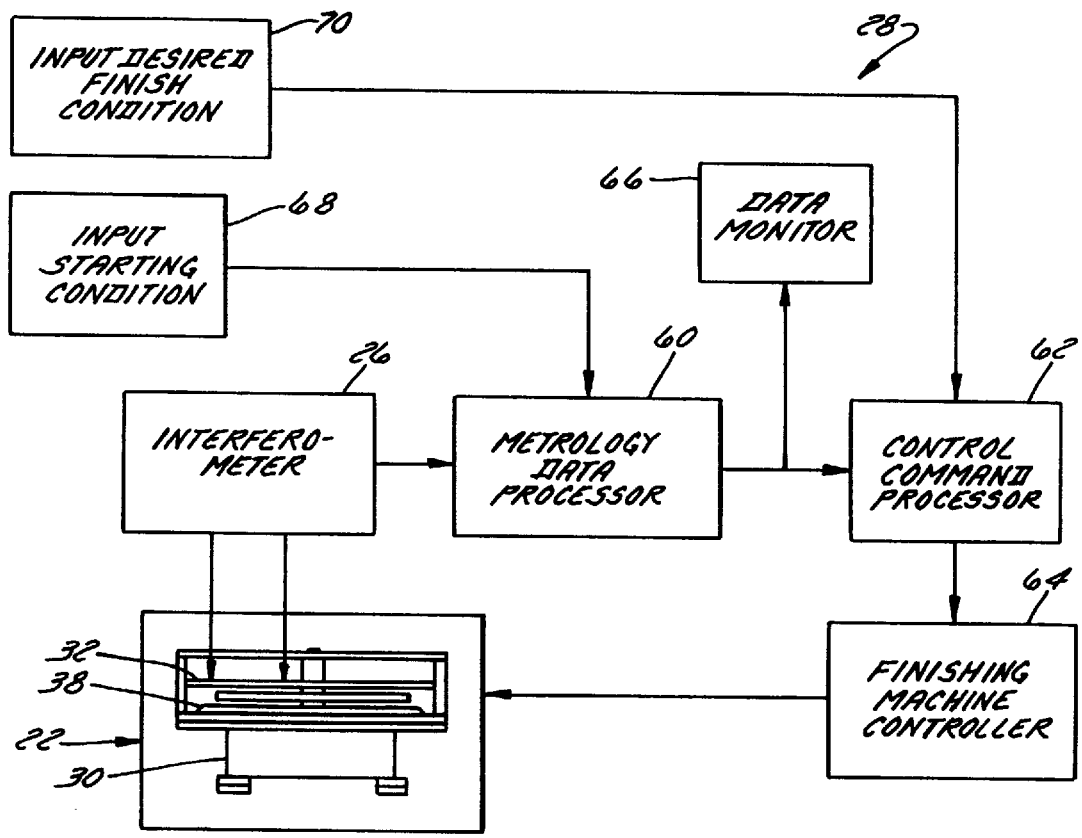
FIG. 3 schematically represents a control system of the surface finishing machine and the in-situ metrology system of FIGS. 1 and 2.

The monitoring/control system 28, illustrated schematically in FIG. 3, is designed to use in-situ metrology results (obtained by operation of the interferometer 26) to provide an indication of the status of the polishing operation and/or to control operation of the ring polisher 22. The monitoring/control system 28 includes as its primary components a metrology data processor 60, a control command processor 62, a finishing machine controller 64, a data monitor or display device 66, and first and second input devices 68 and 70.

The metrology data processor 60 is a general-purpose digital microprocessor that has first and second inputs and at least one output. The first and second inputs receive first and second signals from the GPI mainframe 50 and the first input device 68, respectively. The first input signal is representative of a sensed variation in the optical thickness of the workpiece W as measured by the interferometer 26. The second input signal, entered into the first input device 68 manually or otherwise, conveys information concerning the starting and/or steady-state dimensional parameters of the workpiece W. This data could provide information about 1) the starting profile of the front and/or rear surfaces S1 and S2 of the workpiece W, 2) the coefficient of thermal expansion of the workpiece and/or monitor plug, 3) the refractive index homogeneity of the workpiece W, etc. The metrology data processor 60 combines the first and second signals to produce signals conveying information about one or more dimensional characteristics of the workpiece W such as surface topography, thickness uniformity, thermal deformation, and variations therein.

The control command processor 62 may comprise any suitable programmable processor capable of receiving signals from the metrology data processor 60 and from the second input device 70 and of combining these signals to produce command signals or controlling operation of the ring polisher 22. The signals from the second input device 70 are indicative of one or more desired dimensional characteristics of the workpiece such as a desired workpiece optical thickness uniformity, a desired smoothness of the work or front surface S1 of the workpiece W, and/or a desired profile on the finished or front surface S2. The control command processor 62 combines these signals to produce a finishing machine command signal and transmits this signal to the finishing machine controller 64. The signals could, if desired, also be logged to the monitor 66 for display.

The finishing machine controller 64 may comprise any suitable controller capable of receiving signals from the control command processor 62 and of using these signals to control operation of one or more components of the ring polisher 22 to produce the desired dimensional characteristic(s) on the workpiece 22. The output signals from the finishing machine controller 64 are used to adjust the radial position of the conditioning tool 34 relative to the lap 38 and/or to adjust operation of the slurry supply system 36 to adjust the temperature or flow rate of the slurry.

Hence, the monitoring/control system 28 uses the measurements from the in-situ metrology system 24 to measure one or more dimensional characteristics of the workpiece W and then uses this measurement to control operation of the ring polisher 22 to obtain one or more desired dimensional characteristic(s) on the workpiece W. The manner in which these measurements may be obtained and examples of the resultant control now will be detailed.

3. Metrology and Ring Polisher Control

Figure 4:
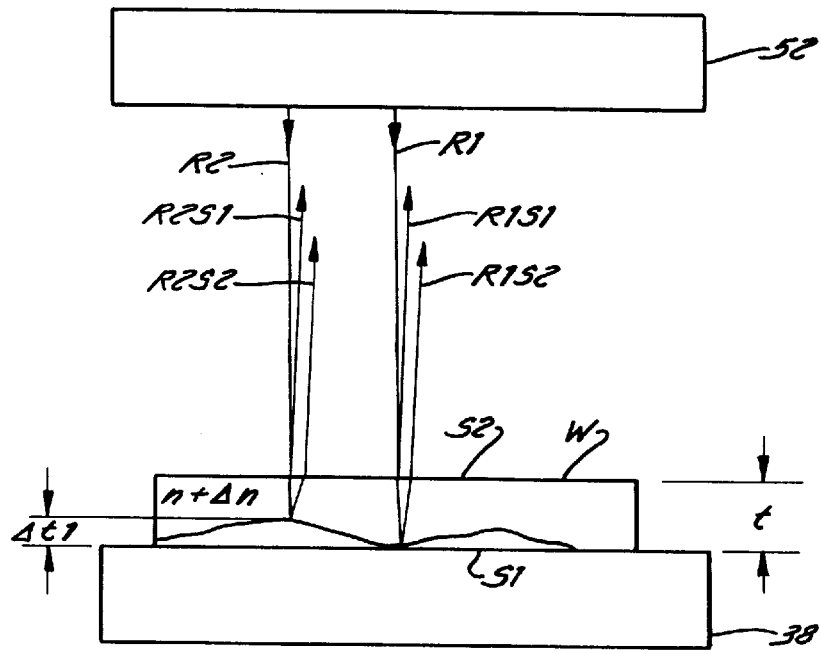
FIG. 4 schematically illustrates first and second surface reflections of a workpiece subjected to in-situ metrology using the surface finishing machine and the in-situ metrology system of FIGS. 1 and 2.

Referring now to FIG. 4, during in-situ metrology, a beam of coherent light is directed from the fold mirror 52 to the lap 38 of the ring polisher 22 as a plurality of rays, two of which are illustrated schematically as R1 and R2, respectively. Whenever the workstation rotates to a position in which a workpiece W, is positioned in the path of the beam as illustrated in FIG. 4, each of the rays is reflected from the front or work surface S1 and the rear surface S2 of the associated workpiece W as first and second wavefronts, respectively. The GPI mainframe 50 combines the first and second wavefronts to form Fizeau interference fringes which provide an indication of the optical path difference from which $\Delta t$ may be discerned. The combined intensity of the two interfering wavefronts is described mathematically by Eqn.(1):

$$I = I_1 + I_2 + 2\sqrt{I_1 I_2}\, \vec{a}_1 \cdot \vec{a}_2 \cos(\phi_1 - \phi_2) \qquad \text{Equation 1}$$

where:

$I_1$ and $I_2$ are the intensities of the wavefronts reflected from the surfaces S1 and S2;

$a_1$ and $a_2$ are unit vectors describing the direction of polarization; and $\phi_1$ and $\phi_2$ are the phases of the wavefronts, respectively.

It may be observed from Eqn.(1) that the intensity of the combined wavefronts varies with the phase difference $(\delta = \phi_1 - \phi_2)$ of the individual wavefronts. When the phase difference equals $2m\pi$ (where m is an integer), the intensity is maximum. On the other hand, when the phase difference equals $2(m+\frac{1}{2})\pi$, the intensity is a minimum. The phase difference $\delta$ therefore may be expressed in terms of 1) the angle formed between the direction of propagation of the two wavefronts reflected from the surfaces S1 and S2, 2) the optical path difference (OPD) experienced by the two wavefronts, and 3) the phase change experienced by each wavefront upon reflection. This relationship is expressed as Eqn.(2):

$$\delta = (\phi_1 - \phi_2) = \frac{4\pi n}{\lambda} t\cos\theta \pm \pi \qquad \text{Equation 2}$$

where:

n is the refractive index of the workpiece;

λ is the wavelength of the interfering wavefronts;

t is the geometric thickness of the workpiece;

θ is the angle formed between the reflected wavefronts; and

±π is the phase change upon reflection.

Hence, a phase difference δ of the combined wavefronts is observed as the optical thickness of the workpiece W varies about its surface area or, alternatively, as the angle between the front and rear surfaces S1 and S2 of the workpiece W varies.

The criteria for the interference fringes as a function of wedge angle between the workpieces surfaces S1 and S2 and as a function of variations in the workpiece's optical thickness over its surface area can then be established by setting the conditions of intensity maxima and minima using the following Eqns. (3) and (4):

$$X_m = \left(\frac{m+1/2}{2n\alpha}\right)\lambda \qquad \text{Equation 3}$$

where:

α is the wedge angle in the workpiece; and $X_m$ is the distance between successive maxima from zero order.

$$\alpha = \lambda/2\Delta X \qquad \text{Equation 4}$$

where

ΔX is the distance separating successive maxima (dark fringes).

Similarly, by writing Equation 2 in terms of optical path difference (OPD), and by setting the conditions for intensity for maxima and minima to be equal, the following Eqn. (5) is derived:

$$t_m = (m+1/2)\frac{\lambda}{n} \qquad \text{Equation 5}$$

where $t_m$ is the difference in workpiece thickness at various maxima.

Hence, a fringe will occur each time the optical thickness (nt) of the workpiece W varies by a multiple of λ/2.

There are three primary contributing sources to the OPD, namely: 1) height differences ($\Delta t_1$) of the front or work surface S1; 2) height differences ($\Delta t_2$) along the rear or non-finished surface S2; and 3) differences in product refractive index homogeneity (Δn). Variations in thickness Δt of the workpiece W can be thought of as combined variations in the thickness $\Delta t_1$ of the front surface S1 and variations in thickness $\Delta t_2$ of the rear surface S2. Variations in refractive index may be described as Δn. The double pass optical path difference (OPD) of the two rays R1 and R2 of FIG. 4 therefore can be characterized by Fizeau fringe interference as follows:

$$FizeauOPD = 2(n\Delta t_1 + n\Delta t_2 + \Delta nt) \qquad \text{Equation 6}$$

The Fizeau OPD can be calculated either manually or automatically from the interferometric measurement and hence is a known factor. Hence, if any two of the three constituents of the summation portion of the Equation 6 are known, Equation 6 can be rewritten to solve for the third, thereby permitting the measurement of a dimensional characteristic of the workpiece (assuming that a measurement other than a variation in optical thickness is desired) and that it therefore is necessary to utilize Eqn. (6)).

For instance, in the case of a typical polishing operation in which the front surface S1 of the workpiece W is polished or otherwise worked to an unknown flatness, the refractive index n, variation in refractive index Δn, and the variation in flatness of the rear surface S2 of the workpiece W can be ascertained in advance using a separate interferometer and stored in the first input device 68 of the control/monitoring system 28 as the starting conditions of the workpiece W.

The unknown flatness of the front surface S1 may be determined according to equation 7.

$$\Delta t_1 = 2[(n\Delta t_1 + n\Delta t_2 + \Delta nt) - (n\Delta t_2 + \Delta nt)]/2n \qquad \text{Equation 7}$$

Equation 7 indicates that the Fizeau OPD error minus the pre-determined OPD contributions of the rear surface flatness error and the refractive index inhomogeneity is larger than the front surface flatness error by a factor of n. Since n is substantial for most materials, the resultant error magnification permits relatively high resolution. For instance, for a workpiece material constructed from fused silica, 1/10 wave of Fizeau OPD error equates to 1/14.6 wave of flatness error.

As described by equation 5, clearly defined fringes only appear when a thickness variation of at least λ/2 exists. When this thickness variation is due purely to a global wedge angle existing between the two surfaces of the workpiece, a straight fringe will appear for each multiple of λ/2 thickness change. When the thickness variation consists of both wedge and surface or refractive index irregularity, the fringes appear curved or otherwise irregular. The straightness of observed interference fringes can thus be interpreted to discern the irregularity of the thickness variations and the number of fringes appearing over a certain area may be interpreted to determine the magnitude of wedge. Irregularity of the thickness variations may thus be converted into a "flatness" measurement by locating the fringe centers and laying down data points on the fringes. The data points can then be curve fit to construct a surface map indicating the flatness error. However, if the front and rear surfaces are completely parallel, there is no wedge angle, and no clearly defined "fringes" appear. Rather, an irregular intensity distribution is visible in the areas where thickness variations exist. This irregular intensity distribution can be difficult to interpret. Furthermore, even when a wedge angle exists, the number of data points which may be plotted and hence the precision of the surface fit is dependent on the number of fringes and hence on the magnitude of the wedge angle. If the wedge angle is too large, the fringe spacing will become too small and the fringes will not be resolvable. Requiring a wedge angle of a certain magnitude between the front and rear surfaces S1 and S2 of the workpiece W could be very restrictive to the process.

Therefore, and in accordance with an especially preferred embodiment of the invention, an alternative method for calculating the Fizeau OPD is to use phase modulation interferometry (PMI), sometimes known as phase shifting interferometry (PSI). In PMI, the phase difference between light received at two pixels of an imaging device is used to determine a height difference between two locations on the test surface corresponding to the two pixels. Phase modulation or phase shifting usually is achieved by varying the optical path of the test light beam spacing between the two surfaces forming the boundaries of the interference cavity during data acquisition. However, it is impossible to vary the distances between interference cavity boundary surfaces in the present case because the interference cavity is defined by the opposed front and rear surfaces S1 and S2 of the workpiece W and because the surfaces S1 and S2 are not dynamically movable relative to one another. However, it is also possible to modulate phase by modulating the wavelength of the light source to produce an equivalent effect. Phase modulation by light source wavelength modulation is disclosed in the Sommargren patent which, as already discussed above, is incorporated herein by reference.

Figure 5A:
FIGS. 5A through 5H are schematic representations of Fizeau interferograms obtained in-situ during a surface polishing operation performed in accordance with a preferred embodiment of the present invention.
Figure 5B:
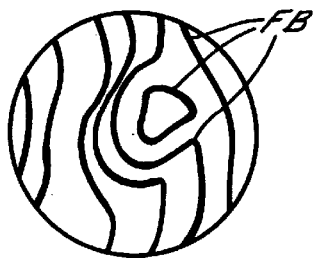
Figure 5C:
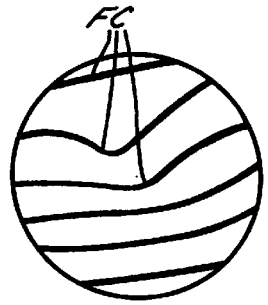
Figure 5D:
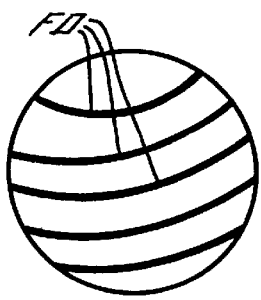
Figure 5E:
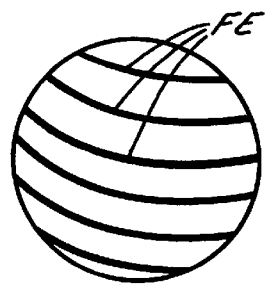
Figure 5F:
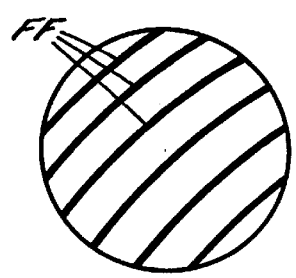
Figure 5G:
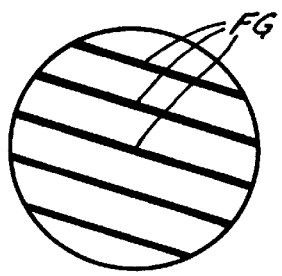
Figure 5H:
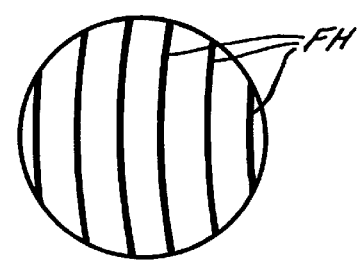

Assuming 1) that flatness error in the rear or non-finished surface S2 of the workpiece W is non-existent or is known and hence can be removed from an analyzed interference pattern and 2) that differences in workpiece refractive index are non-existent or are known and hence can be removed from the analyzed interference pattern, interferometric measurements can produce an image of the work surface in-situ, i.e., as it is subjected to a polishing or other finishing operation. It is therefore possible to observe changes in the Fizeau OPD and to calculate and observe the corresponding changes in the profile of the workpiece front surface S1 as it is worked. Specifically, interference fringes observed in a slightly wedged workpiece will become more parallel as the front or work surface S1 is polished and will become straighter as a convex or concave work surface S1 becomes more planar. In a perfectly parallel workpiece with less than $\lambda/2$ maximum variation in thickness, the interference pattern will simply become of more uniform intensity. Interferograms obtained using this technique and acquired while a workpiece W was polished on the ring polisher 22 are illustrated schematically in FIGS. 5A through FIG. 5H. FIG. 5A illustrates that, at the beginning of the process, the observed interference fringes FA assume an extremely irregular pattern in which they are highly curved and highly non-parallel. This pattern reflects an, irregularly curved surface. The interferograms of FIGS. 5B through 5F (obtained 10 minutes, 30 minutes, 60 minutes, 90 minutes, and 100 minutes into the polishing process, respectively) illustrate that, as the front surface S1 becomes smoother and more planar as it is polished, the observed interference fringes FB through FF become more parallel and straight. FIG. 5G, obtained approximately 105 minutes into the polishing process, illustrates an interference pattern where the observed interference fringes FG of are nearly perfectly parallel and perfectly straight, hence indicating that the work surface 80 of the workpiece W is very smooth and very flat. No more polishing is required at this time. FIG. 5H represents an interferogram obtained 110 minutes into the finishing process—only five minutes after the interferogram of FIG. 5G was obtained. The curved interference fringes FH of this drawings illustrate a situation in which concavity or convexity in the lap 38 of the ring polisher 22 has caused the front or work surface 82 of the workpiece W to overshoot its desired planar profile and to take on a concave or convex profile. An operational parameter of the ring polisher 22 (such as the position of the conditioning tool 34) now will have to be adjusted to compensate for this error.

A comparison of the interferogram of FIG. 5G with the interferogram of FIG. 5H illustrates that the period of time during which a workpiece W exhibits a desired profile may be very short. This time period is dependent on the stability of the finishing environment. This is one reason that a great number of measuring and adjustment iterations are required in a conventional polishing process. Specifically, in a conventional process, by the time an operator removes a workpiece having a slightly concave surface profile for testing, waits for the workpiece to reach dimensional equilibrium, and obtains a profile measurement, the profiles of the work surface of the remaining workpieces may have become overcorrected so that they now are convex. The operator, not being aware of this profile change, would adjust the position of the conditioning tool 34 to increase the convexity of the work surface S1 of the workpieces—thereby exacerbating the problem. This error would not be recognized until the next measurement is taken as much as three hours later. Additional iterations or "hunting" therefore would be required to correct the problem. This hunting is avoided or at least substantially reduced by the present invention because the operator can obtain an instantaneous indication of the prevailing profile of the workpiece W as it is being polished so that he can remove the workpiece from the ring polisher 22 at the appropriate time.

In-situ metrology has been discussed thus far primarily in conjunction with flatness testing. However, it may often be desirable to obtain other measurements from Fizeau OPD data. One such measurement is transmitted wavefront error or TWE. TWE evaluation is desirable in some instances because the relationship between Fizeau OPD and TWE provides greater sensitivity than the relationship between Fizeau OPD and flatness error. If variations in a workpiece's refractive indices are negligible or are known and can be electronically subtracted out of the OPD data, then TWE can be related to the Fizeau OPD as follows:

$$TWE = FizeauOPD\left(\frac{n-1}{n}\right) \quad \text{Equation 8}$$

Substituting OPD for its constituents as discussed above in conjunction with Equation 6 and adding in the effect of refractive index inhomogeneity yields the following equation:

$$TWE = 2((n-1)\Delta t_1 + \Delta nt + (n-1)\Delta t_2) \quad \text{Equation 9}$$

Figure 6:
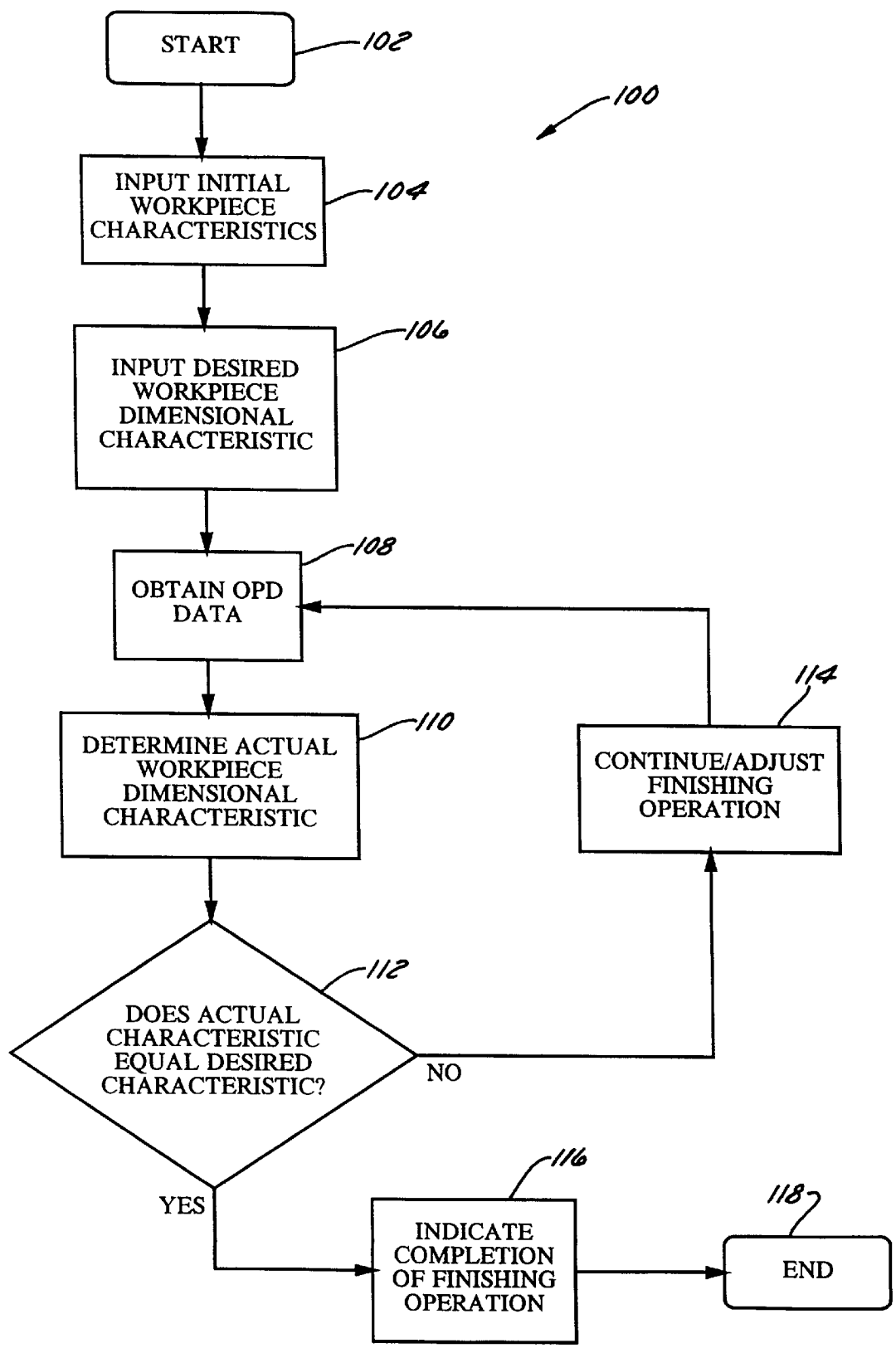
FIG. 6 is a flowchart of a process for the automatic, closed loop adjustment of a finishing operation using in-situ metrology results as control signals for the finishing process.

Once work surface flatness data (Eqn. (7)) or TWE data (Eqn. (9)) is acquired by the metrology data processor 60, that data may be logged to the monitor 66 and/or transmitted to the control command processor 62 to cause the finishing machine controller 64 to maintain or adjust operation of the ring polisher 22 in a closed loop to obtain the desired finish on the front surface 80 of the workpiece W. A preferred process for this technique now will be described in conjunction with the process 100 of the flowchart of FIG. 6.

The process 100 proceeds from START in Step 102 to Step 104 in which the operator inputs initial workpiece characteristics using the first input device 68 of FIG. 3. These characteristics may, for example, comprise information concerning the profile of the rear or unfinished surface S2 of the workpiece W, and/or the refractive index of the workpiece W. Then, in Step 106, the operator inputs a desired dimensional characteristic of the workpiece W using the second input device 70. This characteristic could be the maximum allowable Fizeau OPD or, in the case of a surface polishing operation, could comprise a desired polished surface profile and/or polished surface smoothness.

Fizeau OPD data then is obtained in Step 108 using the interferometer 26, and the magnitude of the dimensional characteristic of interest is determined in Step 110 by the metrology data processor 60. This dimensional characteristic may, for instance, comprise the workpiece thickness uniformity or the surface profile of the work surface S1. This information and/or information derived from it may if desired be logged to the monitor 66 for display. Next, in Step 112, the control/command processor 62 compares the measured value of the surface characteristic(s) of interest to a desired or optimal value of the characteristic(s) and determines whether or not adjustment is required. The results of this determination can be displayed in the monitor 66 and/or can be transmitted to the finishing machine controller 64 in Step 114 as a command signal for controlling ring polisher operation. In the absence of slurry temperature control (detailed in Section 4 below), machine control usually will be limited to changing the radial position of the conditioning tool 34 relative to the lap 38 of the ring polisher 22. Hence, in Step 114, the control command processor 62 will control the finishing machine controller 64 to move the conditioning tool 34 in or out to increase or decrease the concavity of the lap 38. The process then returns to Step 108, and Steps 108, 110, 112, and 114 are repeated in a closed loop until the command control processor 62 determines in Step 112 that the actual characteristic(s) (e.g., work surface profile) equals the desired characteristic(s), at which time a signal will be delivered to the monitor 66 in Step 116 to generate a suitable audio or video signal indicating completion of the finishing process. The process 100 then proceeds to END in Step 118.

OPD data obtained in-situ can also be used to obtain indications about other characteristics of the workpiece being finished. One such characteristic, temperature differential, now will be discussed.

4. In-situ Measurement of Temperature Differential Across A Workpiece

Figure 7:
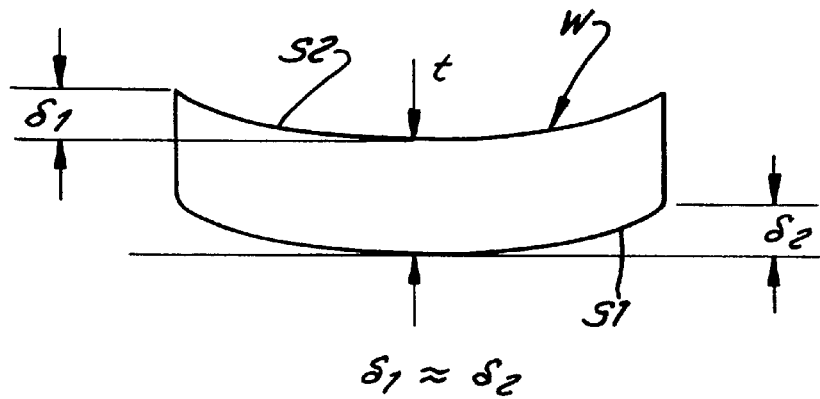
FIG. 7 schematically illustrates thermal deformation of a flat circular workpiece.

Discussion of ring polisher control has concerned up to this point control of the conditioning tool 34. However, it is also desirable to adjust operation of the ring polisher 22 so as to eliminate (or at least compensate for) workpiece thermal distortion during the polishing process. Friction generated due to abrasive contact with the slurry-laden grit during the polishing process heats the workpiece W so that it exhibits a temperature differential between its front or work surface S1 and its rear surface S2. The resulting temperature gradient across the workpiece's thickness causes it to distort so that both surfaces S1 and S2 deform spherically as illustrated in FIG. 7. The magnitude $\delta_1$ or $\delta_2$ of this distortion is equal at both surfaces S1 and S2 (and hence can be considered a single value $\delta_T$) and is directly dependent upon the magnitude of the temperature gradient. It would be beneficial to measure the temperature differential $\Delta T$ between the front and rear surfaces S1 and S2 as accurately as possible (preferably to within a few hundredths of a degree Fahrenheit or finer) in order to eliminate it or at least to compensate for it during the polishing process. It has been discovered that this temperature differential can be ascertained with a high degree of precision using the above-described OPD measurements.

For instance, assuming the surfaces S1 and S2 of the workpiece W are of a plane circular shape, the thermal deformation of each surface is spherical such that the "hotter" front surface S1 becomes increasingly convex with increased temperature and the "cooler" rear surface S2 becomes increasingly concave. In the absence of external forces which would constrain thermal deformations, the sag of the deformation may be described by the following equation:

$$\delta_T = \frac{L^2 \alpha \Delta T}{8t} \qquad \text{Equation 10}$$

where:

$\delta_T$ is the maximum magnitude of deformation of the workpiece or "sag" over an infinite plane of thickness t and over a diameter L;

$\alpha$ is the workpiece's coefficient of thermal expansion; and $\Delta T$ is the axial thermal differential between the front and rear surfaces of the workpiece.

Figure 8A:
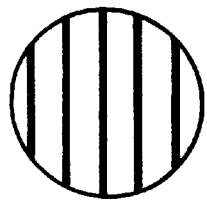
FIGS. 8A, 8B; 9A, 9B; and 10A, 10B illustrate the evolution in deformation of a workpiece as it is finished under the influence of an axial temperature differential.

The workpiece W will deform uniformly across its thickness t if heat transfer is uniform over its surface area. Thus, as seen in FIG. 8A, a light beam incident at any set of points on the workpiece will not experience a difference in optical path length. The observed Fizeau OPD therefore will remain unchanged as the workpiece W deforms due to a temperature differential across its thickness t.

Figure 8B:
Figure 9B:

However, as the front surface S1 of the workpiece W becomes convex due to thermal distortion, the convex surface S1 will concentrate the force of its mass at the apex A as seen in FIG. 8B. Preston's Equation dictates that the rate of material removal from any point on a workpiece's work surface is directly proportional to the force applied at that point (Pressure, P) and velocity, V:

$$\frac{dh}{dt} = CPV \qquad \text{Equation 11}$$

where:

$\frac{dh}{dt}$ is the rate of material removal at a particular point per unit of time;

C is the workpiece's constant of proportionality;

P is the local pressure; and

V is the velocity of workpiece movement with respect to the lap.

Figure 9A:
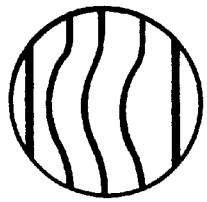

Therefore, the flatness of the polished surface S1 of the workpiece W will begin to change as a result of its being polished in a deformed state. This change is illustrated by a flattening of the central portion of the workpiece surface S1 and can be observed as a change in the OPD as measured by the in-situ metrology system (compare FIG. 9A with FIG. 8A).

Figure 10A:
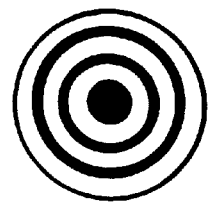
Figure 10B:
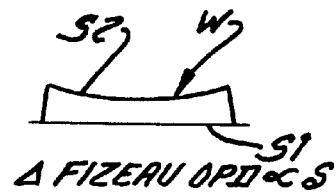

As the convex work surface S1 of the workpiece W continues to be polished, the convexity of the surface S1 will be worn away until the surface S1 is again flat with respect to the polishing lap as illustrated in FIG. 10B, at which time the rate of material removal will become uniform over the entire surface S1. A discernible OPD now is present as evidenced by FIG. 10A. At this time, the Fizeau OPD measurement, representing a difference in thickness between the now-flat front surface S1 of the workpiece and the still-concave rear surface S2, constitutes a direct measurement of sag $\delta_T$.

It will usually be necessary to determine whether the observed difference in thickness is induced solely by the temperature differential between the front and rear surfaces S1 and S2 or whether some component of its thickness variation is resulting from an out-of-flat lap. This determination can be made by comparing the measured flatness with the flatness of a separate monitor plug which preferably is worked along with the "true" workpiece and hence exhibits the same thickness variation resulting from an out-of-flat lap as the "true" workpiece W. Assuming the monitor plug is made from a thermally insensitive material and thus exhibits the surface flatness currently being produced by the lap, one may attribute any difference $\delta_T$ in surface flatness of the "true" workpiece and monitor plug as due to thermal deformation of the "true" workpiece. This knowledge may then be used either to calculate $\Delta T$ and adjust the slurry temperature to eliminate $\Delta_T$ or at least to reduce $\Delta_T$ to an acceptable value, or to simply adjust the slurry temperature to some value and continue polishing until the desired dimensional characteristic of the "true" workpiece is obtained.

Specifically, once $\delta_T$ is known, the temperature differential $\Delta T$ can be determined by solving Eq.(10) for the following Eq. (12):

$$\Delta T = \frac{8 t \delta_T}{L^2 \alpha} \quad \text{Equation 12}$$

Once this temperature difference is known, measurements can be taken to adjust the polishing operation so as to eliminate the temperature difference or to at least compensate for it. In the illustrated example in which the polishing operation is performed by a ring polisher 22 having a slurry supply system 36 with slurry temperature control, the OPD measurements can be used for closed-loop control of the heater/chiller 44 of the slurry supply system 36.

Figure 11:
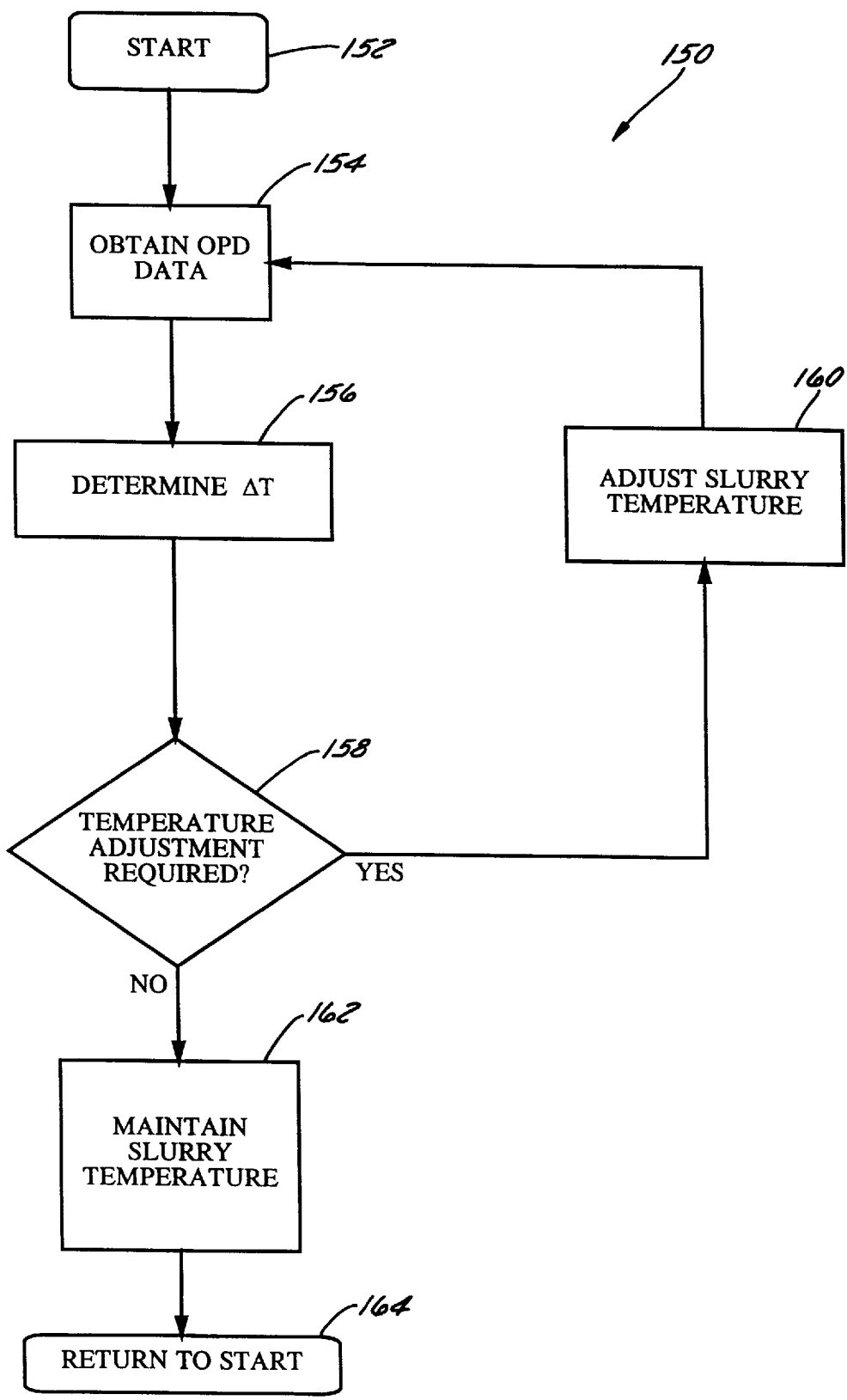
FIG. 11 is a flowchart of a process for the automatic control of a finishing machine slurry temperature using in-situ metrology results as control signals for the temperature control process.

For instance, referring to the flowchart of FIG. 11, a preferred process 150 for achieving these results proceeds from START in Step 152 to Step 154 in which OPD data is obtained. The temperature difference $\Delta T$ between the front or work surface S1 and the rear surface S2 then is obtained by the metrology data processor 60 in Step 156 using the technique described above. The magnitude of $\Delta_T$ may if desired be displayed on the data monitor 66. Then, in Step 158 the control command processor 62 determines whether or not the magnitude of $\Delta T$ is sufficiently large to warrant adjustment of the slurry temperature either upwardly or downwardly. If so, the process proceeds to Step 160, where the control command processor 62 causes the finishing machine controller 64 to transmit an output signal to the slurry supply system 36 so as to increase or decrease the temperature of the slurry circulating over the lap 38. The process 150 then returns to Step 154, where an additional OPD measurement is obtained.

The process 150 then proceeds through the Steps 154, 156, and 158 in an iterative fashion until $\Delta T$ is eliminated or at least reduced to within acceptable parameters, at which point the process proceeds to Step 162 in which the control command processor 62 causes the finishing machine controller 64 to cause the slurry supply system 36 to maintain the slurry at its current temperature. The process 150 then returns to START (Step 152) and is repeated for so long as the polishing operation continues.

Many changes and modifications could be made to the invention without departing from the spirit thereof. For instance, as discussed above, the invention is applicable to a variety of surface finishing operations in addition to the above-described polishing operation. Various monitoring and control schemes also could be utilized in addition to or in place of those described above. For instance, although in-situ metrology is described as taking place without interrupting the finishing process, turntable rotation could be interrupted during interferogram acquisition (but there still would be no need to remove the workpiece W from the lap 38). The scope of these changes will become apparent from the appended claims.

I claim:

1. A method of finishing a workpiece comprising:
   (A) subjecting a work surface of said workpiece to a finishing process in a finishing machine; and
   (B) during the finishing process, measuring a dimensional characteristic of said workpiece, wherein the measuring step uses a phase shifting interferometer that directs wavelength modulated light into said workpiece and that recombines interfering wavefronts of light reflected from said work surface and from another surface of said workpiece located opposite said work surface to generate a phase modulated interferogram indicative of the measured dimensional characteristic, and wherein the measuring step is performed while said workpiece is on said finishing machine.

2. A method as defined in claim 1, further comprising adjusting at least one parameter of the finishing process in response to the measuring step.

3. A method as defined in claim 2, further comprising, in response to the measuring step, determining that said workpiece exhibits a desired dimensional characteristic, and wherein
   the adjusting step comprises terminating the finishing operation upon determining that said workpiece exhibits the desired characteristic.

4. A method as defined in claim 3, wherein the desired characteristic is a desired finished surface profile.

5. A method as defined in claim 3, wherein the desired characteristic is a desired uniformity of thickness.

6. A method as defined in claim 1, wherein the measuring step comprises measuring variations in an optical thickness of said workpiece.

7. A method as defined in claim 6, further comprising obtaining, from the measurement, an indication of the profile of the work surface.

8. A method as defined in claim 2, wherein the adjusting step comprises adjusting operation of said finishing machine to cause an actual dimensional characteristic of said workpiece to approach a desired dimensional characteristic.

9. A method as defined in claim 8, wherein the desired dimensional characteristic is a desired work surface profile.

10. A method as defined in claim 8, wherein said finishing machine is a ring polisher, said ring polisher including a rotating table, a lap which is disposed on said table, and a rotating conditioning tool which is supported on said lap and which is movable radially with respect to said table to alter a profile of said lap, and wherein the adjusting step comprises altering the position of said conditioning tool radially relative to said table to alter the profile of said lap.

11. A method of finishing a workpiece comprising:
   (A) subjecting at least one work surface of said workpiece to a finishing process in a finishing machine;
   (B) during the finishing process, measuring a dimensional characteristic of said workpiece, wherein the measuring step uses an interferometer and is performed while said workpiece is on said finishing machine;
   (C) obtaining an indication of thermal distortion of said workpiece using the results of the measuring step; and
   (D) determining a temperature difference across said workpiece.

12. A method as defined in claim 11, wherein the step of obtaining an indication of thermal distortion of said workpiece comprises obtaining an indication of a total difference in thickness of said workpiece, obtaining an indication of a total difference in thickness of a thermally insensitive monitor plug being finished by said finishing machine, and attributing a detected difference in thickness between said workpiece and said monitor plug to thermal distortion of said workpiece.

13. A method as defined in claim 11, further comprising altering the temperature of a slurry circulating through said finishing machine if a temperature differential is detected as a result of the determination step.

14. A method as defined in claim 11, wherein the measuring step is performed while the work surface of said workpiece is being finished by said finishing machine.

15. A method of finishing a workpiece comprising:
 (A) subjecting a work surface of said workpiece to a finishing process in a finishing machine; and
 (B) during the finishing process,
  (1) measuring an optical thickness of said workpiece using a phase shifting interferometer, the measuring step being performed while said workpiece is on said finishing machine and including directing wavelength modulated light into said workpiece and recombining interfering wavefronts of light reflected from said work surface and from another surface of said workpiece located opposite said work surface to generate a phase modulated interferogram indicative of the measured dimensional characteristic,
  (2) obtaining, from said phase modulated interferogram, an indication of a designated dimensional characteristic of said workpiece,
  (3) determining whether the actual value of the designated characteristic differs from a desired value of the designated characteristic,
  (4) adjusting at least one parameter of the finishing process so as to cause the actual value of the designated characteristic to approach the desired value, and
  (5) repeating the steps (1) through (4) iteratively until the actual value of the designated characteristic at least substantially equals the desired value.

16. A method of finishing a workpiece comprising:
 (A) polishing a first surface of said workpiece in a ring polisher, said ring polisher including a rotating table, a lap which is disposed on said table, and a rotating conditioning tool which is supported on said lap and which is movable radially with respect to said table to alter a profile of said lap; and
 (B) while said workpiece is being polished,
  (1) transmitting a beam of wavelength modulated coherent radiation into said workpiece so as to produce first and second reflected beams from the first surface of said workpiece and a second surface of said workpiece disposed opposite said first surface,
  (2) combining the first and second reflected beams to form a phase modulated interferogram serving as a measurement of an optical thickness of said workpiece,
  (3) determining, from the phase modulated interferogram, an indication of the actual profile of said first surface of said workpiece,
  (4) determining whether the actual profile differs from a desired profile,
  (5) adjusting the radial position of said conditioning tool relative to said table so as to adjust the profile of said lap to cause the actual profile of said first surface to approach the desired profile, and
  (6) repeating the steps (1) through (5) iteratively until the actual profile of the first surface of said workpiece substantially equals the desired profile.

17. A method as defined in claim 16, wherein the adjusting step is performed automatically.

18. A method of finishing a workpiece comprising:
 (A) polishing a first surface of said workpiece in a ring polisher, said ring polisher including a rotating table, a lap which is disposed on said table, and a rotating conditioning tool which is supported on said lap and which is movable radially with respect to said table to alter a profile of said lap; and
 (B) while said workpiece is being polished,
  (1) transmitting a beam of coherent radiation into said workpiece so as to produce first and second reflected beams from the first surface of said workpiece and a second surface of said workpiece disposed opposite said first surface,
  (2) combining the first and second reflected beams to form an interference pattern serving as a measurement of an optical thickness of said workpiece,
  (3) determining, from the measurement, an indication of the actual profile of said first surface of said workpiece,
  (4) determining whether the actual profile differs from a desired profile,
  (5) adjusting the radial position of said conditioning tool relative to said table so as to adjust the profile of said lap to cause the actual profile of said first surface to approach the desired profile, and
  (6) repeating the steps (1) through (5) iteratively until the actual profile of the first surface of said workpiece substantially equals the desired profile;
 (C) obtaining an indication of thermal distortion of said workpiece based upon the results of the combining step; and
 (D) determining a temperature difference between said first and second surfaces of said workpiece, and wherein the adjusting step comprises adjusting the temperature of a slurry circulating through said ring polisher.

19. A method as defined in claim 18, wherein the step of obtaining an indication of thermal distortion of said workpiece comprises obtaining an indication of a total difference in thickness of said workpiece, obtaining an indication of a total difference in thickness of a thermally insensitive monitor plug being finished by said finishing machine, and attributing a detected difference in thickness between said workpiece and said monitor plug to thermal distortion of said workpiece.

20. A system comprising:
 (A) a ring polisher, said ring polisher including a rotating table, a lap which is disposed on said table, a ring assembly which moves a workpiece to be polished over said lap, and a rotatable conditioning tool which is supported on said lap and which is movable radially with respect to said table to alter a profile of said lap;
 (B) a phase shifting interferometer which is positioned with respect to said lap so as to perform in-situ metrology on a work surface of the workpiece being polished on said lap, said interferometer being configured to transmit wavelength modulated light into the workpiece and to recombine interfering wavefronts of light reflected from the work surface and from another surface located opposite the work surface to generate a phase modulated interferogram indicative of a dimensional characteristic of the workpiece; and (C) a controller which is operationally coupled to said interferometer and which generates an output signal in response to operation of said interferometer.

21. A system as defined in claim 20, wherein said output signal is a humanly-discernible signal indicative of a dimensional characteristic of the workpiece.

22. A system as defined in claim 20, wherein said controller is electronically coupled to said conditioning tool, and wherein said output signal is a control signal which automatically repositions said conditioning tool radially relative to said table so as to alter a profile of said lap.

23. A system as defined in claim 20, wherein said interferometer is a phase shifting interferometer.

24. A system comprising:
(A) a ring polisher, said ring polisher including a rotating table, a lap which is disposed on said table, a ring assembly which moves a workpiece to be polished over said lap, a rotatable conditioning tool which is supported on said lap and which is movable radially with respect to said table to alter a profile of said lap, and a slurry supply system which circulates slurry over said lap and which adjusts the temperature of said slurry;
(B) a phase shifting interferometer at least a portion of which is positioned over said lap and which is capable of performing insitu metrology on a work surface of the workpiece being polished on said lap; and
(C) a controller which is operationally coupled to said interferometer and to said ring polisher, wherein said controller is automatically operable, based upon signals received from said interferometer, to
  (1) obtain an indication of a dimensional characteristic of the work surface of the workpiece and to alter the radial position of said conditioning tool relative to said table so as to alter a profile of said lap, and
  (2) obtain an indication of a temperature differential across the workpiece and to cause said slurry supply system to alter the temperature of said slurry.

25. A method of finishing a workpiece comprising:
(A) subjecting a work surface of said workpiece to a finishing process in a finishing machine; and
(B) during the finishing process, measuring a dimensional characteristic of said work surface of said workpiece, wherein the measuring step comprises
  (1) impinging wavelength modulated light onto said workpiece,
  (2) combining first and second interfering wavefronts reflected from said work surface and another surface of said workpiece located opposite said work surface to produce a phase modulated interferogram; and
  (3) determining, from said phase modulated interferogram, said dimensional characteristic.

26. A system comprising:
(A) a ring polishing finishing machine including a workstation for receiving a workpiece to be subjected to a finishing operation on a work surface thereof;
(B) a phase shifting interferometer which is positioned with respect to said workstation so as to perform in-situ metrology on the workpiece located at said workstation, said interferometer being configured to transmit wavelength modulated light into the workpiece and to recombine interfering wavefronts of light reflected from the work surface and from another surface located opposite the work surface to generate a phase modulated interferogram indicative of a dimensional characteristic of the workpiece,
(C) a controller which is operationally coupled to said phase shifting interferometer and which generates an output signal in response to operation of said phase shifting interferometer, wherein said output signal is a control signal which controls at least one operational parameter of said finishing machine, and
(D) said ring polishing finishing machine further comprising a slurry supply system which circulates slurry over said lap and which controls the temperature of said slurry, wherein said controller is operable, using signals from said phase shifting interferometer, to determine a temperature difference across the workpiece, and wherein said controller is coupled to said slurry supply system and is operable, based upon the determined temperature difference across the workpiece, to automatically cause said slurry supply system to alter the temperature of said slurry.

27. A system comprising:
(A) a ring polisher, said ring polisher including a rotating table, a lap which is disposed on said table, a ring assembly which moves a workpiece to be polished over said lap, and a rotatable conditioning tool which is supported on said lap and which is movable radially with respect to said table to alter a profile of said lap;
(B) a phase shifting interferometer which is positioned with respect to said lap so as to perform in-situ metrology on a work surface of the workpiece being polished on said lap, said phase shifting interferometer being configured to transmit wavelength modulated light into the workpiece and to recombine interfering wavefronts of light reflected from the work surface and from another surface located opposite the work surface to generate a phase modulated interferogram indicative of a dimensional characteristic of the workpiece; and
(C) a controller which is operationally coupled to said phase shifting interferometer and which generates an output signal in response to operation of said phase shifting interferometer, and wherein said ring polisher further comprises a slurry supply system which circulates slurry over said lap and which adjusts the temperature of said slurry,
wherein
  said controller is operable, using signals from said phase shifting interferometer, to determine a temperature difference across the workpiece, and
wherein
  said controller is coupled to said slurry supply system and is operable, using the determined temperature difference across the workpiece, to automatically cause said slurry supply system to alter the temperature of said slurry.

28. A system comprising:
(D) a ring polisher, said ring polisher including a rotating table, a lap which is disposed on said table, a ring assembly which moves a workpiece to be polished over said lap, and a rotatable conditioning tool which is supported on said lap and which is movable radially with respect to said table to alter a profile of said lap;
(E) a phase shifting interferometer which is positioned with respect to said lap so as to perform in-situ metrology on a work surface of the workpiece being polished on said lap, said phase shifting interferometer being configured to transmit wavelength modulated light into the workpiece and to recombine interfering wavefronts of light reflected from the work surface and from another surface located opposite the work surface to generate a phase modulated interferogram indicative of a dimensional characteristic of the workpiece; and (F) a controller which is operationally coupled to said phase shifting interferometer and which generates an output signal in response to operation of said phase shifting interferometer.

29. A system comprising:

(A) a finishing machine including a workstation for receiving a workpiece to be subjected to a finishing operation on a work surface thereof;

(B) phase shifting interferometer which is positioned with respect to said workstation so as to perform in-situ metrology on the workpiece located at said workstation, said interferometer being configured to transmit wavelength modulated light into the workpiece and/to recombine interfering wavefronts of light reflected from the work surface and from another surface located opposite the work surface to generate a phase modulated interferogram indicative of a dimensional characteristic of the workpiece; and (C) a controller which is operationally coupled to said phase shifting interferometer and which generates an output signal in response to operation of said phase shifting interferometer wherein said output signal is a control signal which controls at least one operational parameter of said finishing machine, wherein said finishing machine is a ring polisher, said ring polisher including a rotating table, a lap which is disposed on said table, and a rotatable conditioning tool which is supported on said lap and which is movable radially with respect to said table to alter a profile of said lap; wherein said controller is electronically coupled to said conditioning tool and automatically alters the radial position of said conditioning tool relative to said table based upon signals received from said phase shifting interferometer;

wherein said ring polisher further comprises a slurry supply system which circulates slurry over said lap and which controls the temperature of said slurry;

wherein said controller is operable, using signals from said phase shifting interferometer, to determine a temperature difference across the workpiece, and wherein said controller is coupled to said slurry supply system and is operable, based upon the determined temperature difference across the workpiece, to automatically cause said slurry supply system to alter the temperature of said slurry.

30. A system comprising:

a ring polisher, said ring polisher including a rotating table, a lap which is disposed on said table, a ring assembly which moves a workpiece to be polished over said lap, and a rotatable conditioning tool which is supported on said lap and which is movable radially with respect to said table to alter a profile of said lap;

a phase shifting interferometer which is positioned with respect to said lap so as to perform in-situ metrology on a work surface of the workpiece being polished on said lap, said interferometer being configured to transmit wavelength modulated light into the workpiece and to recombine interfering wavefronts of light reflected from the work surface and from another surface located opposite the work surface to generate a phase modulated interferogram indicative of a dimensional characteristic of the workpiece; and a controller which is operationally coupled to said interferometer and which generates an output signal in response to operation of said interferometer, wherein said ring polisher further comprises a slurry supply system which circulates slurry over said lap and which adjusts the temperature of said slurry, wherein said controller is operable, using signals from said interferometer, to determine a temperature difference across the workpiece, and wherein said controller is coupled to said slurry supply system and is operable, using the determined temperature difference across the workpiece, to automatically cause said slurry supply system to alter the temperature of said slurry.

* * * * *